(No Model.)
W. S. WEST.
ELEVATED FILTER BED.
No. 334,629. Patented Jan. 19, 1886.
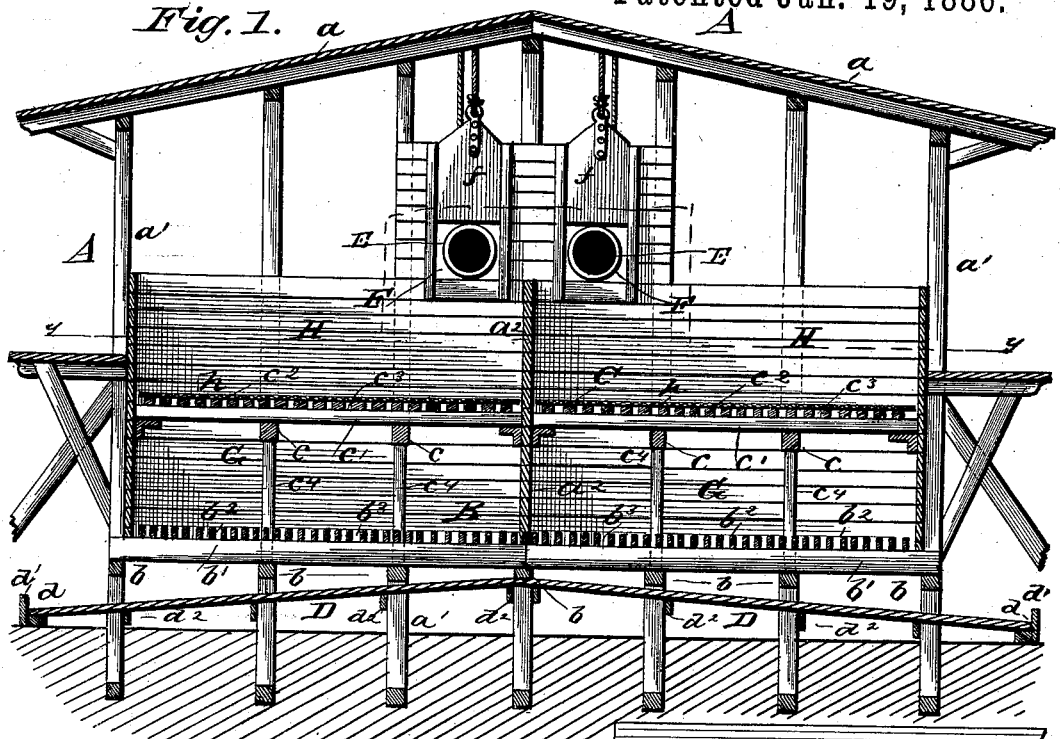
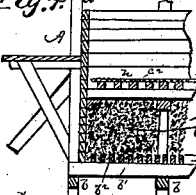
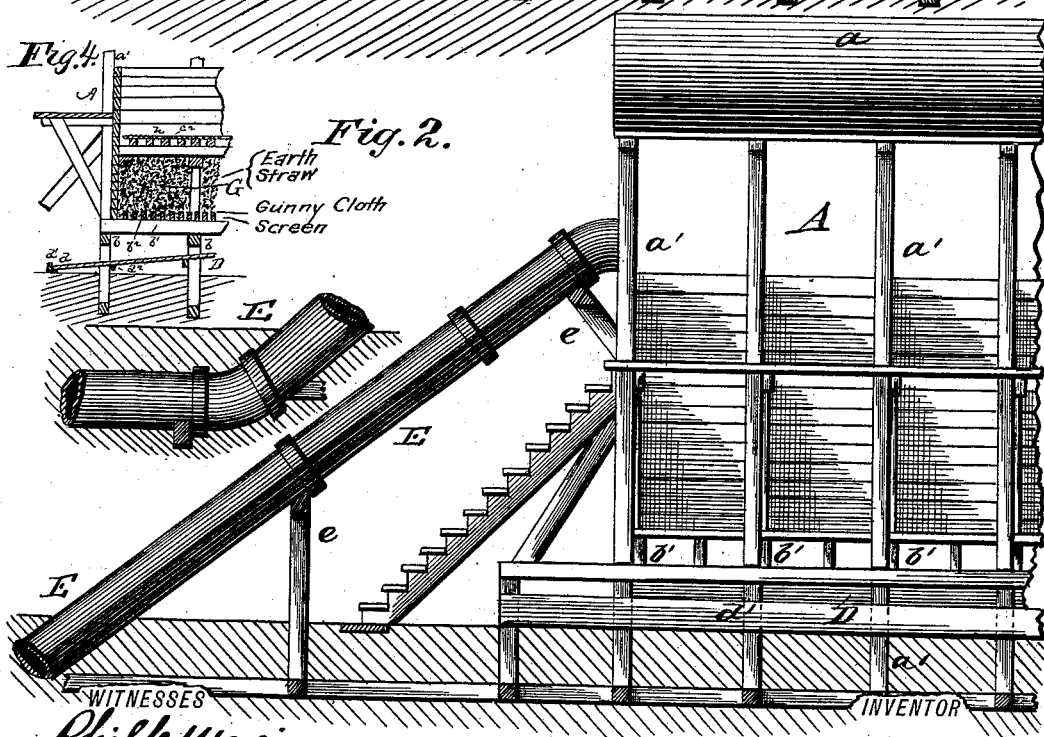
WITNESSES
Phil. C. Masi.
Grace M. Craig
INVENTOR
W. Scott West.
By his Attorneys
Anderson Smith

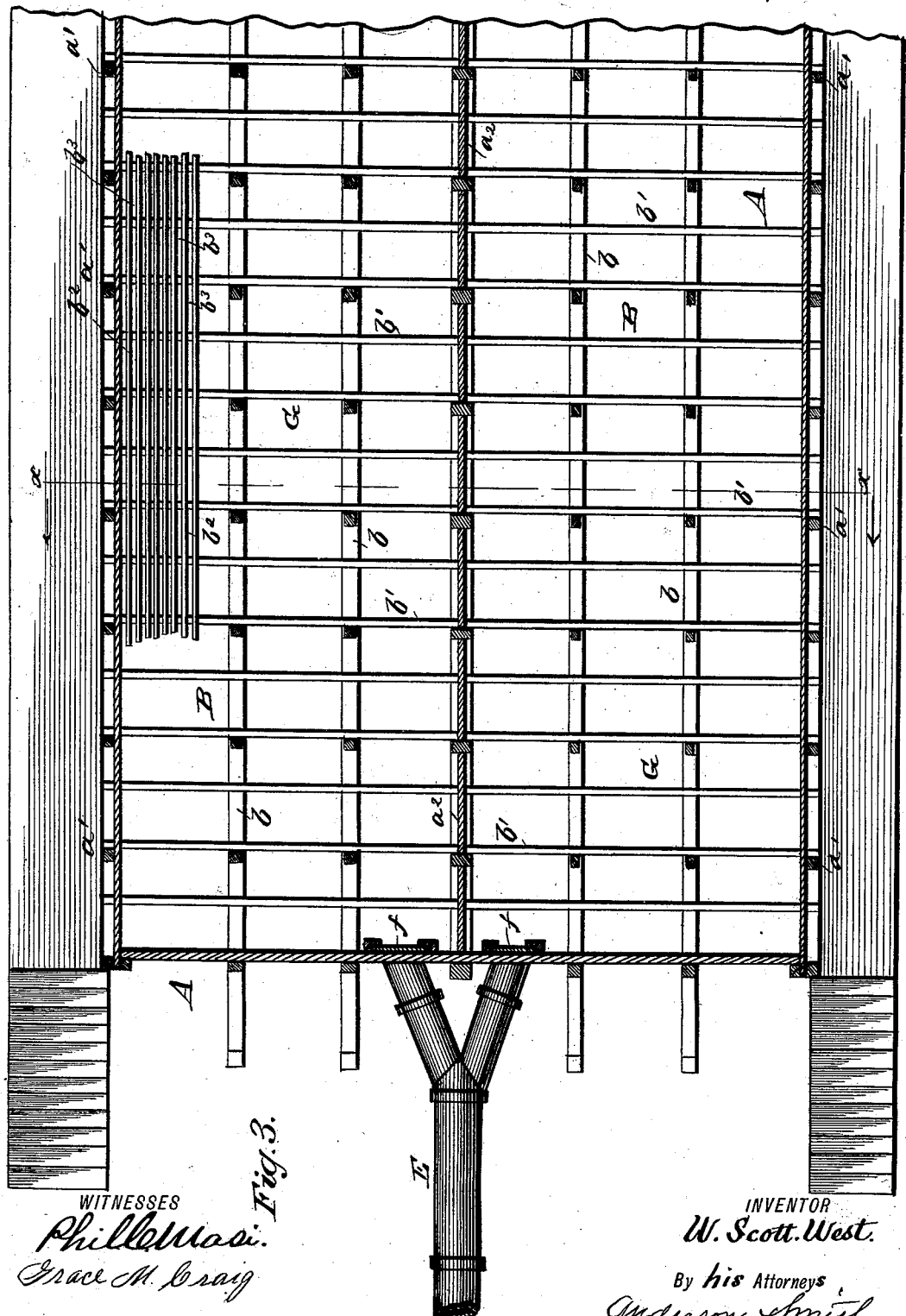

UNITED STATES PATENT OFFICE.

WALTER SCOTT WEST, OF NEW YORK, N. Y.

ELEVATED FILTER-BED.

SPECIFICATION forming part of Letters Patent No. 334,629, dated January 19, 1886.

Application filed October 30, 1885. Serial No. 181,409. (No model.)

*To all whom it may concern:*

Be it known that I, WALTER SCOTT WEST, a citizen of the United States, residing at New York, in the county of New York and State of New York, have invented certain new and useful Improvements in Elevated Filter-Beds; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a sectional elevation taken on the line $x\,x$, Fig. 3. Fig. 2 is a portion of a side elevation. Fig. 3 is a horizontal section on the line $y\,y$, Fig. 1. Fig. 4 is a detail sectional view showing the filtering material in position.

The invention relates to means for filtering the effluent water or sewage, when utilizing the latter by combining it with earth and other matter to form a fertilizer, its main object being to prevent the said effluent water from defiling adjacent rivers or rather water-courses, it being rendered harmless while passing through the filter-bed.

The invention consists in the construction of a filter-bed, hereinafter described and claimed, and the combination of the same with a system of sewerage.

In the accompanying drawings, A designates the frame of the filter-bed provided with the roof $a$ and supported a proper distance above the surface of the earth by the standard-frames $a'\,a'$ or other suitable means. The said frame is in the form of a house and may have any desired length to accommodate different quantities of sewage.

If desirable, the filter-frame may be divided longitudinally by a vertical partition, $a^2$. In that case the sewerage-pipe entering the same would be bifurcated at its end, so as to discharge into each compartment.

B is the floor of the filter-bed, composed of the longitudinal joints $b$, the parallel cross-strips $b'$, secured thereto, and the longitudinal strips $b^2$, secured to the cross-strips and forming therewith the similar rectilinear spaces, $b^3$. The above is the preferable construction; but any style of perforated floor would serve the purpose.

C is a floor similar to and a suitable distance above the floor B and composed of the longitudinal joists $c$, cross-strips $c'$, and longitudinal strips $c^2$, all arranged similarly to those above described.

$c^3$ are the spaces between the strips $c'$ and $c^2$, and $c^4\,c^4$ are standards which support the floor C from the floor B. The said standards rest upon the joists $b$ and support the joists $c$.

D D are inclined planes or chutes below the floor B. The said chutes run downwardly on each side from the central standard-frame, $a'$, which is vertically below the partition $a^2$, to points a suitable distance to the outer side of the filter-bed, and form at said points the gutters $d$ with the vertical walls $d'$. The chutes may have a slight incline longitudinally, and run sufficiently far to discharge into a suitable stream or upon the surface of the earth. The floor B is held a short distance above the top of the chutes by means of the transverse beams $d^2$, which run between it and the top beams of the standard-frames, as shown.

E is a sewage-pipe bending upward and supported by proper stays, $e\,e$. The said pipe is bifurcated, each arm of the bifurcation discharging through an opening, F, in the front wall of one of the compartments of the sewers near the central partition and about four feet above the floor C.

$f\,f$ are hanging valves, moving in side clips or ways and adapted to close the openings F.

The floors B and C form between them the chamber G to contain earth as hereinafter described, and above the floor C is the chamber H, designed to be filled with sewage up to the openings F. The sewage flows in through the pipe E, either from a reservoir situated high enough to give a proper head, or is pumped through the pipe E from a receiving-well by mechanism having substantially the construction of that shown in the patent granted to me on the 4th day of June, 1872, and numbered 275,533.

The method in which the filter-bed operates is as follows: Both floors B and C are covered with gunny-cloth or equivalent material, and the floor B is also covered with straw.

The chamber G is then filled with earth, and the chamber H filled to the openings F with sewage in the manner described. The sewage forces itself by hydrostatic pressure through the spaces $c^3$, the earth, and the spaces $b^3$, and falls upon the chutes D and is conveyed away thereby, as described. In passing through the gunny-cloth $h$ on the floor C the grease is removed from the water and deposited on the upper surface of said cloth, while the earth in the chamber G absorbs all the ammonia and other fertilizing and harmful substances out of the sewage and allows the effluent water thereof to drain off and escape, as described. The gunny-cloth and straw prevent the earth from falling through the spaces in the floor B, and the standards $c^4$ prevent the floor C from sagging and compressing and packing the earth so that it would not allow the sewage-water to percolate through.

The filter-bed is made in two compartments, so that one can be cleaned out while the other is being used. To do this proper gates or valves are provided on the arms of the bifurcations of the pipe E, so that one can be closed when cleaning the corresponding chamber.

Having described this invention, what I claim, and desire to secure by Letters Patent, is—

The combination of the filter-bed frame A, provided with the floors B and C, each composed of the longitudinal joists, cross-strips, and longitudinal strips, substantially as described, and the latter braced upon the former by the standards $c^7$, with the chutes D, inclined slightly longitudinally, and the walls $d'$, forming the gutters $d$ therewith, substantially as specified.

In testimony whereof I affix my signature in presence of two witnesses.

W. SCOTT WEST.

Witnesses:
M. P. CALLAN,
PHIL. C. MASI.